United States Patent [19]

Dalvi et al.

[11] 4,168,217

[45] Sep. 18, 1979

[54] ROAST-LEACH COPPER RECOVERY

[75] Inventors: Ashok D. Dalvi, Soroako, Indonesia; Ramamritham Sridhar, Mississauga; Malcolm C. E. Bell, Oakville, both of Canada

[73] Assignee: The International Nickel Company, Inc., New York, N.Y.

[21] Appl. No.: 894,900

[22] Filed: Apr. 10, 1978

[30] Foreign Application Priority Data

May 13, 1977 [CA] Canada ................................. 278361

[51] Int. Cl.[2] ................................................. C25C 1/12
[52] U.S. Cl. ................................... 204/108; 423/41; 423/47; 75/7
[58] Field of Search .................... 204/108; 423/41, 45, 423/47, 153, 154, 594, 1; 75/7

[56] References Cited

U.S. PATENT DOCUMENTS

| 1,634,497 | 7/1927 | Greenawalt | 204/108 |
|---|---|---|---|
| 2,783,141 | 2/1957 | Foley | 75/26 |
| 2,817,583 | 12/1957 | Schlecht et al. | 75/7 |
| 3,524,802 | 8/1970 | Clevenger | 204/108 |
| 3,751,240 | 8/1973 | Green | 75/117 |
| 3,839,013 | 10/1974 | Tukdogan et al. | 75/115 |
| 3,883,344 | 5/1975 | Griffith | 75/26 |
| 3,959,437 | 5/1976 | Rastas et al. | 423/41 |

OTHER PUBLICATIONS

Shirts et al., "Double Roast-Leach Electrowinning Process for Chalcopyrite Concentrates", U.S. Bureau of Mines R.I7996 (1975).
Quenean, Editor, *Extractive Metallurgy of Copper, Nickel, Cobalt* Interscience Publishers, N.Y., 1961, p. 26, [TN780M4].

*Primary Examiner*—Brian Hearn
*Attorney, Agent, or Firm*—Lewis Messulam; Ewan C. MacQueen

[57] ABSTRACT

A copper-containing sulfidic material is dead-roasted at a temperature of at least 750° C. and the resulting calcine is leached in a sulfuric acid solution to dissolve most of the copper in preference to any iron, nickel and cobalt in the material.

7 Claims, 3 Drawing Figures

ROAST-LEACH COPPER RECOVERY

The present invention relates to a method of recovering copper from sulfide materials which contain nickel and iron intimately mixed with the copper. It is particularly useful for the treatment of cupriferous mattes or fractions of such mattes.

For the purpose of the present specification and claims the expression "matte fraction" is used to denote sulfidic materials which constitute a portion of a smelted matte and have been separated from the remainder of such a matte either by leaching away of that remainder or by the well known matte separation process involving slow cooling of the matte and physical separation of the resulting phases.

BACKGROUND OF THE INVENTION

Conventional procedure for treating cupriferous ores and concentrates involves the steps of smelting the concentrate to produce a matte containing most of the copper, converting the matte to remove more iron therefrom, blowing the resulting white metal to blister copper, further refining of the copper to produce anode metal and finally electrorefining the latter to pure copper. In the course of smelting the concentrate sulfur dioxide emission problems can be coped with economically by resorting to flash-smelting techniques using pure oxygen to produce relatively low-volume, high-concentration sulfur-dioxide off-gasses. However during the subsequent converting operation sulfur dioxide emission is a more difficult problem to deal with due to the tendency to produce comparatively dilute gas streams. Newer converter designs, and resort to continuous converting practice represent recent steps to deal with the problem.

An important factor in the cost and complexity of pyrometallurgical processing is the handling and treatment of the various slags generated to recover the copper inevitably present therein. Since these have to be treated and fed back to the smelter, they represent a large copper recycle, which is particulaly significant in the case of continuous converting where slags produced are richer in copper than would be the case for batch-converting.

The presence of nickel in the cupriferous concentrate further complicates the smelter operation in that it is generally necessary to ensure a copper to nickel ratio of 100 or more in the blister copper. To achieve this, nickel is removed in the converting cycle and this results in substantial amounts of copper being removed with the slagged nickel, which is generally fed into the nickel recovery circuit. For example, if a concentrate has a copper to nickel ratio of about 20, its treatment by the above route will result in about one quarter of the total copper input being transferred to the nickel recovery circuit with the nickel-containing converter slags. Moreover where cobalt is present overall slag losses lead to poor cobalt recoveries.

More recently an alternative processing route which has been investigated consists in roasting the concentrate and thereafter leaching with water and/or sulfuric acid. Such an approach is described in U.S. Pat. No. 2,783,141 which is directed to the use of fluid-bed apparatus for performing the roast. Variations of the approach include carrying out the roast in more than one stage at increasing temperatures (see U.S. Pat. No. 3,751,240) or at decreasing temperatures (see U.S. Pat. No. 3,883,344). It has also been proposed to use a controlled sulfur dioxide atmosphere during part of the roast (see U.S. Pat. No. 2,817,583) or during the whole roasting stage (see U.S. Pat. No. 3,839,013). A characteristic feature of the processes described in these patents is that the object of the roasting is to ensure sulfation of the copper, and to this end only partial roasting is sought, as opposed to dead-roasting which would leave copper in the form of oxide rather than sulfate. For this reason emphasis is invariably placed on roasting at temperatures below that at which copper sulfate tends to decompose. Thus roasting is carried out below 750° C. and generally at 675° C., 550° C. or even lower temperatures, and such a procedure is said to ensure maximization of the amount of copper which is rendered acid soluble.

An important shortcoming of the above-mentioned prior art roast-leach procedures is that it is difficult to achieve the desired degree of selectivity between copper and other metals, such as nickel, cobalt and iron, which are present in the sulfide treated. In the case of smelted materials, not only is selectivity found to be poor, but indeed the solubilization of copper itself is found to be unacceptably poor. The latter problem has not been confronted by prior workers inasmuch as they have applied the procedure only to ores and concentrates.

It is an object of the invention to provide an improved process for recovering copper selectively from sulfidic materials wherein other metals are intimately mixed with the copper.

SUMMARY OF THE INVENTION

Generally speaking, the invention is based on the discovery that if a cupriferous sulfide material is essentially free of siliceous gangue, and is roasted at a temperature high enough to ensure dead-roasting, the resulting calcine can be leached with sulfuric acid to dissolve a very high proportion of the copper without dissolving extensive amounts of any nickel, cobalt or iron present in the material.

Accordingly the present invention provides a process for recovering copper from sulfidic material which comprises a cupriferous matte or matte fraction containing at least one of the metals iron, nickel and cobalt, comprising dead-roasting the material at a temperature of at least about 750° C. to provide a calcine which is essentially sulfur-free, cooling the calcine and thereafter leaching it in an aqueous sulfuric acid solution at a temperature of at least about 50° C., and separating pregnant leach liquor in which is dissolved most of the copper initially present in the material from leach residue containing most of any iron, nickel and cobalt initially present in the material.

DETAILED DESCRIPTION

The temperature at which the roasting is carried out is critical to achieving desired good leaching properties of the resulting calcine. A minimum temperature of 750° C. is essential because a lower temperature would be detrimental not only to the eventual recovery of copper in the pregnant leach liquor, but also to the selectivity of the leach between copper and the other metals. Thus in contrast to prior workers who were concerned with concentrates rather than mattes and reported recoveries of the order of 90% or more for temperatures as low as 500° or 600° C., we have found that in the case of mattes a lowering of the roasting temperature to even as much as 700° C. in copper recoveries of only about 55% in the leach liquor. (Unless otherwise specified all percentages quoted herein are percentages by weight). At the other extreme, too high a roasting temperature leads to poorer copper recovery or extensive nickel extraction, i.e. poorer leach selectivity, and therefore the temperature should not exceed about 950° C. A roasting temperature of about 800° C. has been found to give optimum results. At such a temperature a retention time of between 1 hour and 3 hours has been found satisfactory to lower the sulfur content of the feed to about 0.5% or less.

The composition of the matte or matte fraction treated is relevant to the copper extraction and also to the selectivity which can be achieved. In order to ensure high copper extractions it is preferred that the relative copper, cobalt, nickel and iron contents of the feed material be such as to ensure that the calcine produced by the dead-roast contains at least 40% of copper oxide. This will be the case if the weight ratio of Cu/(Fe+Ni+Co) exceeds 0.75. Moreover in order to minimize extraction of the other metals, it is preferable, though by no means essential, that their contents be correlated such that the weight ratio of Fe/(Ni+Co) is about 2. This correlation favors the formation of insoluble ferrites during the roasting to tie up the iron, nickel and cobalt. Where a given matte is too low in copper to satisfy the desired correlation, this can be normally remedied by adjusting the smelting conditions to yield a higher grade copper matte.

Roasting can be done in any of the various known forms of apparatus and can proceed autogenously. Preferably a fluid-bed roaster is used because of the higher throughput possible in such a roaster, as well as because of the relatively high sulfur dioxide concentration in its off-gases. For the purpose of fluid-bed roasting the feed should preferably be in the form of particles of between about 100 and 600 micron diameter. Where the initial feed is a fine powder pelletization will be needed. However where the feed material is derived from a previously molten matte the desired particles can be produced by water granulation of the hot matte. The latter approach is preferred in that it leads to less dusting during the fluid-bed roasting operation.

The calcine produced by the roast, after cooling, and if necessary grinding, is slurried with an aqueous sulfuric acid solution which can conveniently comprise the spent electrolyte from a copper electrowinning operation. Thus the lixiviant may contain some dissolved copper in addition to the free sulfuric acid. While a leach temperature of at least 50° C. is needed for practicable leach rates to be achieved, temperatures of 80° C. or more have the undesirable effect of increasing nickel and iron dissolution. For optimum results a leach temperature of 60°–70° C. should be used and at these temperatures a retention time of 2-3 hours has been found to give good results. Under the preferred conditions of matte composition, roasting conditions and leach conditions it is possible to obtain a pregnant leach liquor which contains 80 or 90% of the total copper in the feed, while less than 10% of any of the other metals will have been solubilized. After solid-liquid separation the liquor can be used to electrowin a high purity copper product, while the residue is treated to recover nickel and cobalt, as well as any precious metals which may have been present in the feed.

Apart from enabling selective copper extraction from mattes, the roast-leach process of the present invention possesses several inherent advantages over the concentrate roasting processes previously advocated. Important among these is the fact that the higher roasting temperature enables the elimination from the calcine of harmful impurities such as selenium, which would not be volatilized at the lower temperatures used for concentrate roasting. Moreover the present dead-roasting route generates copper oxide which reacts with sulfuric acid in the spent electrolyte used for leaching it, whereas the partial roasting route produces copper sulfate which consumes no acid upon dissolution so that the acid generated during electrowinning would have to be disposed of.

Some examples of the process of the invention will now be described with reference to the accompanying drawings.

EXAMPLE 1

A sulfide concentrate containing copper, nickel, iron, sulfur, silica, lime and magnesia was smelted at 1250° C. to produce a matte having the following composition:
copper: 41%
nickel: 10.5%
iron: 21%
sulfur: 21.5%.

This matte was water granulated from the molten state, and then roasted in an 18 cm diameter fluid-bed roaster at 800° C. for 6 hours whereby its sulfur content was reduced to less than 0.5%. The roasted product was ground in a hammer mill to minus 100 mesh Tyler Screen Size (TSS), and mixed with 150 g/l sulfuric acid solution to provide a slurry of 140 g/l solids density. The slurry was maintained at 60° C. for 2.5 hours and thereafter separated into a pregnant liquor and a leach residue which represented 49% of the weight of the roasted calcine. The clear liquor was analyzed and found to contain 52 g/l of copper, 0.73 g/l of nickel and 2.4 g/l of iron, which represents extractions of 89%, 5% and 8% for copper, nickel and iron respectively.

The test therefore will be seen to have produced a solution wherein the copper to nickel and copper to iron ratios were 71 and 22 respectively, from a matte where these ratios were 3.9 and 1.9 respectively.

EXAMPLE 2

Figure 1:
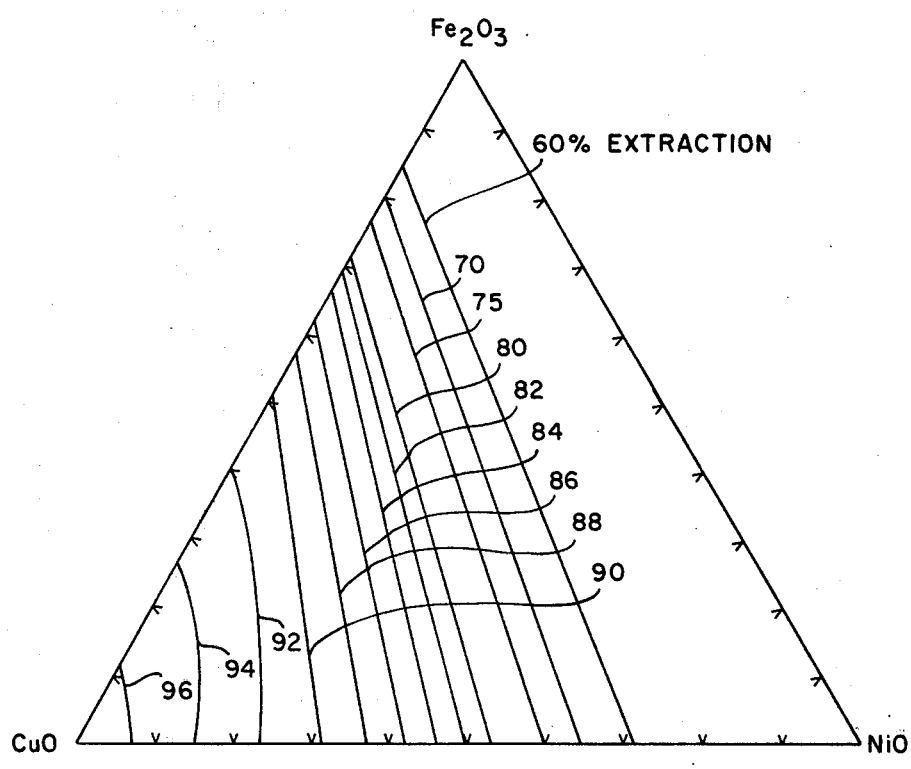
FIG. 1 is a graph illustrating the effect of the composition of the roasted calcine on the extraction of copper in the process of the invention.

A series of roast-leach tests were carried out on mattes of various compositions using a similar procedure to that described in connection with Example 1 above, except that the duration of roasting was 3 hours in all cases. For each test the calcine was analyzed and the effect of calcine composition on both copper extraction and selectivity of leaching was determined. The copper extraction profiles for extractions of 60 to 96% are shown on the ternary plot of FIG. 1 which depicts the composition of the roasted calcine. It will be seen from this drawing that improved extractions are obtained at higher copper oxide contents of the calcine, and that a 40% CuO content will ensure an extraction of 75–85% depending on the relative amounts of iron and nickel. Such a copper oxide content will be ensured if the Cu/(Fe+Ni) ratio in the calcine (and hence in the starting matte) is greater than 0.75. Inasmuch as cobalt behaves similarly to nickel the requirement can be expressed as: Cu/(Fe+Ni+Co)≧0.75.

Figure 2:
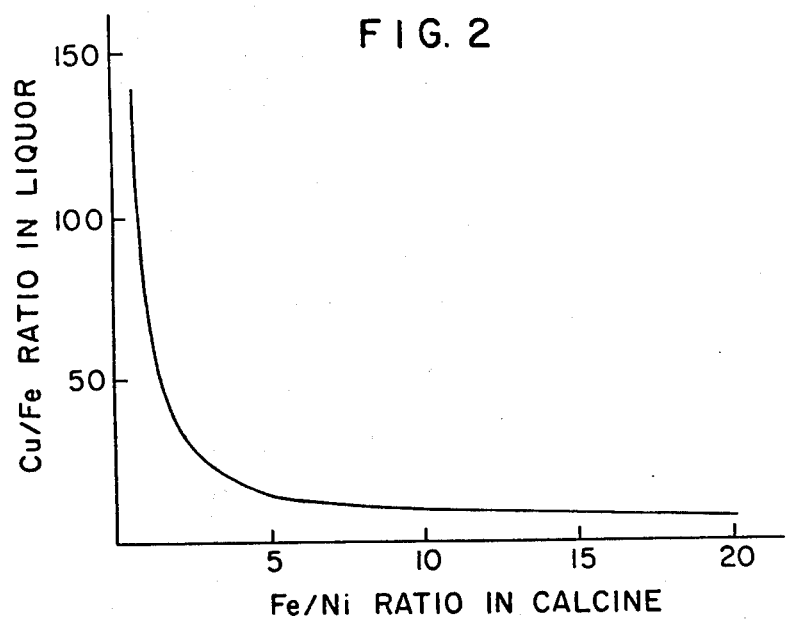
FIGS. 2 and 3 are graphs which illustrates the effect of the correlation of the iron and nickel contents of the matte on the selectivity of the process of the invention.
Figure 3:
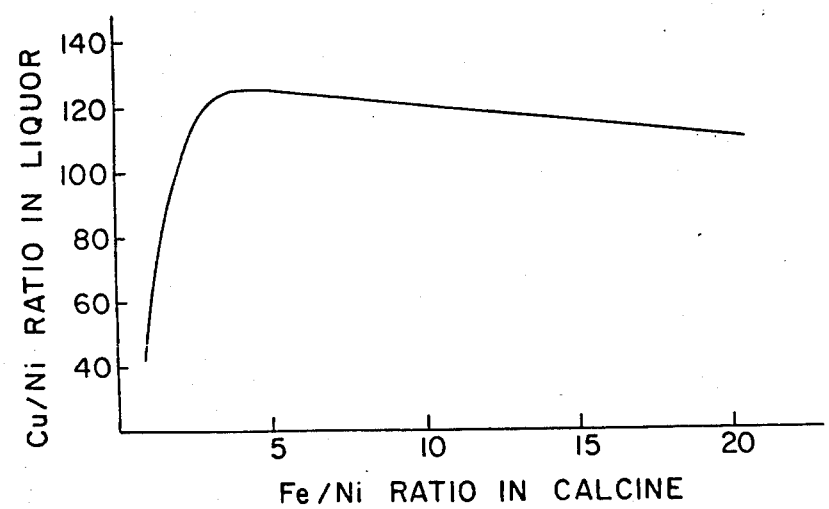

The effect of the calcine composition on the leach selectivity may be seen from the plots of FIGS. 2 and 3. Referring first to FIG. 2, this shows the copper to iron ratio in the leach liquor for various iron to nickel ratios in the calcine. It will be seen that the copper to iron selectivity decreases rapidly as the Fe/Ni ratio increases up to about 3 and more slowly thereafter. Good copper to iron selectivity requires the iron to nickel ratio to be as low as practicable, e.g., Fe/Ni≦2.

The corresponding copper to nickel selectivity can be seen from the plot of FIG. 3 to increase rapidly as the Fe/Ni ratio increases to about 4 and to decrease very slowly thereafter. Thus it can be said that for good copper-nickel selectivity the Fe/Ni ratio should be as high as practicable, e.g., Fe/Ni≧2. Hence to obtain the desired selectivity of copper over both iron and nickel a ratio of iron to nickel of about 2 would represent the most preferred condition. Where cobalt is also present the requirement can be expressed as Fe/(Ni+Co)=2.

EXAMPLE 3

To determine the optimum roasting temperature a series of roast-leach tests were carried out on granulated mattes containing between 41 and 48% copper, 16–18% iron and 8% nickel. Using a procedure and apparatus similar to those described in the preceding examples, dead-roasting was carried out for three hours at one of the temperatures: 600°, 700°, 750°, 800° and 920° C. In each case the roasted calcine was thereafter leached in a solution which contained 60 g/l of copper, 0.6 g/l of nickel, 0.2 g/l of iron and 150 g/l of sulfuric acid, the leach being conducted at 60° C. for 2 hours. From assays of the pregnant liquor the percentage extractions of the copper, nickel and iron present in the calcine were calculated to be as shown in Table 1.

TABLE 1

| Roasting Temperature (°C.) | Percentage Extracted | | |
|---|---|---|---|
| | Cu | Ni | Fe |
| 600 | 15 | 22 | 45 |
| 700 | 49 | 13 | 27 |
| 750 | 80 | 10 | 17 |
| 800 | 92 | 7 | 10 |
| 920 | 87 | 7 | 7 |

A similar set of experiments was undertaken with a matte containing 42.9% copper, 1.9% nickel and 26.8% iron. Roasting was performed at a temperature of between 700° and 900° C. for 1.5 hours and leaching was carried out at 60° C. for 3 hours using a solution containing 60 g/l of copper, 1 g/l of nickel, 1 g/l of iron and 150 g/l of sulfuric acid. The extraction results for this series of experiments are shown in Table 2 below.

TABLE 2

| Roasting Temperature (°C.) | Percentage Extracted | | |
|---|---|---|---|
| | Cu | Ni | Fe |
| 700 | 54 | 26 | 14 |
| 800 | 88 | 9 | 8 |
| 850 | 82 | 7 | 6 |
| 900 | 83 | 9 | 5 |

The above results demonstrate the criticality of using a roasting temperature of at least 750° C., in that both of the tests at 700° C. gave poor copper recovery as well as undesirably high iron and nickel recoveries. The 600° C. test vividly illustrates the inapplicability to mattes of the prior-advocated low temperatures roasting. The results of both the above tables show that 800° C. is the optimum roasting temperature, leading to maximum copper solubilization together with good selectivity of leaching.

EXAMPLE 4

The effect of roasting time was investigated by conducting a series of roast-leach tests on a matte of similar composition to that used for the results of similar composition to that used for the results of Table 2 above. The procedure adopted in this case differed from that used to obtain the results of Table 2 only in that a roasting temperature of 850° was used for all the tests and the roasting time was varied for the different tests. Table 3 below shows the percentage extractions which were determined.

TABLE 3

| Roasting Time (mins) | Percentage Extracted | | |
|---|---|---|---|
| | Cu | Ni | Fe |
| 17 | 62 | 39 | 48 |
| 40 | 88 | 28 | 39 |
| 53 | 90 | 18 | 26 |
| 90 | 89 | 22 | 28 |
| 180 | 87 | 10 | 13 |
| 360 | 86 | 13 | 11 |

As the above results indicate, very short roasting times lead to poor copper extraction as well as poor copper-nickel and copper-iron separations. The copper extraction was highest for a roasting period of about one hour and decreased slowly for longer roasting periods. The selectivity of the leach improved with increased roasting time. Thus for this matte a roast of about 1 to 3 hours should provide the optimum copper extraction and leach selectivity.

EXAMPLE 5

A matte fraction, comprising a copper rich phase separated from a matte by slow cooling the latter, was used as a feed for a series of roast-leach tests designed to determine the effect of leaching temperature on the efficiency of the process. The starting material contained 74.3% copper, 3.4% nickel, 0.1% cobalt, 0.2% iron, the balance being sulfur. It was pelletized, then dead-roasted for 6 hours at 850° C. and samples thereof were leached for 2 hours in a 150 g/l sulfuric acid solution at each of several temperatures. Table 4 below shows the percentages of the various metals which were extracted from the calcine.

TABLE 4

| Leach Temperature (°C.) | Percentage Extracted | | | |
|---|---|---|---|---|
| | Cu | Ni | Co | Fe |
| 60 | 87.1 | 7.7 | * | 11.2 |
| 70 | 88.0 | 9.7 | 16.2 | 15.2 |
| 80 | 88.8 | 11.7 | 19.0 | 17.4 |
| 90 | 89.9 | 15.3 | 18.1 | 22.0 |

*Not determined.

These tests showed that leaching temperatures in excess of 70° C. are undesirable in view of the fact that there is little improvement in copper extraction, but a considerable increase in the extractions of the other metals, i.e. poorer selectivity.

While the present invention has been described with reference to preferred embodiments thereof, various modifications may be made to these embodiments without departing from the scope of the invention which is defined by the appended claims.

We claim:

1. A process for recovering copper from a sulfidic material which comprises a cupriferous matte or matte fraction which contains iron and at least one of the metals nickel and cobalt, the weight ratio of the copper content to the sum of the iron, nickel and cobalt contents being greater than 0.75, comprising roasting the material at a temperature of at least about 750° C. for a duration sufficient to eliminate substantially all of the sulfur to provide a calcine which is essentially sulfur-free, cooling the calcine and thereafter leaching it in an aqueous sulfuric acid solution at a temperature of at least about 50° C. but less than about 80° C., and separating pregnant leach liquor in which is dissolved most of the copper initially present in the material from leach residue containing most of any iron, nickel and cobalt initially present in the material.

2. A process as claimed in claim 1 wherein the ratio of the iron content to the sum of the nickel and cobalt contents in the material is about 2.

3. A process as claimed in claim 1 wherein the dead-roasting is carried out at a temperature of about 800° C.

4. A process as claimed in claim 3 wherein the dead-roasting is carried out for a period of about 1 to 3 hours.

5. A process as claimed in claim 1 wherein the leaching is carried out at about 60°–70° C.

6. A process as claimed in claim 5 wherein the duration of the leach is about 2–3 hours.

7. A process as claimed in claim 1 wherein the pregnant leach liquor is subjected to electrowinning to recover the copper therefrom, and spent electrolyte from the electrowinning operation is recycled to constitute the aqueous sulfuric acid solution for leaching a further supply of dead-roasted sulfide material.

* * * * *